(12) United States Patent
Bliss

(10) Patent No.: US 12,437,036 B2
(45) Date of Patent: *Oct. 7, 2025

(54) DATA PROVENANCE TRACKING SERVICE

(71) Applicant: Microsoft Technology Licensing, LLC, Redmond, WA (US)

(72) Inventor: William James Bliss, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 162 days.

This patent is subject to a terminal disclaimer.

(21) Appl. No.: 18/502,556

(22) Filed: Nov. 6, 2023

(65) Prior Publication Data
US 2024/0070240 A1 Feb. 29, 2024

Related U.S. Application Data

(63) Continuation of application No. 17/077,935, filed on Oct. 22, 2020, now Pat. No. 11,847,193.

(51) Int. Cl.
| | |
|---|---|
| *G06F 21/16* | (2013.01) |
| *G06F 16/22* | (2019.01) |
| *G06F 16/245* | (2019.01) |
| *G06F 16/28* | (2019.01) |
| *G06Q 30/018* | (2023.01) |

(52) U.S. Cl.
CPC .............. *G06F 21/16* (2013.01); *G06F 16/22* (2019.01); *G06F 16/245* (2019.01); *G06F 16/285* (2019.01); *G06Q 30/0185* (2013.01); *G06Q 2220/10* (2013.01)

(58) Field of Classification Search
CPC .......... G06F 21/10; G06F 21/50; G06F 21/16; G06F 16/22; G06F 16/245; G06F 16/285; H04L 63/10; H04L 2463/101; H04L 2209/605; H04L 2209/60
See application file for complete search history.

(56) References Cited

U.S. PATENT DOCUMENTS

| | | | |
|---|---|---|---|
| 10,606,766 B1 * | 3/2020 | Rellinger | ................. G06F 21/60 |
| 10,810,320 B2 * | 10/2020 | Dowlatkhah | ......... H04L 63/105 |

(Continued)

OTHER PUBLICATIONS

Balasheb et al., "A provenance-based access control model for securely storing data in cloud," 2017 2nd International Conference for Convergence in Technology (I2CT) Year: 2017 | Conference Paper | Publisher: IEEE.*

(Continued)

*Primary Examiner* — Roderick Tolentino
(74) *Attorney, Agent, or Firm* — Schwegman Lundberg & Woessner, P.A.

(57) ABSTRACT

Disclosed in some examples are methods, systems, devices, and machine-readable mediums which utilize digital tracking tags attached to data to monitor and/or control the data as it moves between applications and/or computing devices. The digital tracking tag may be embedded in the data (e.g., as a digital watermark) or associated with the data e.g., as metadata. In some examples, the digital tracking tag may include an address of a tracking database with which to record one or more events related to the data. For example, recipients, senders, or other participants in a data transfer event may register the data transfer event with the tracking database.

20 Claims, 7 Drawing Sheets

(56) References Cited

U.S. PATENT DOCUMENTS

| | | | | |
|---|---|---|---|---|
| 11,599,423 | B1* | 3/2023 | Natanzon | G06F 11/1464 |
| 2016/0078247 | A1* | 3/2016 | Tucker | G06F 21/602 |
| | | | | 726/1 |
| 2016/0359850 | A1* | 12/2016 | Weiss | H04L 63/0846 |
| 2016/0364550 | A1* | 12/2016 | Pathak | H04L 63/0428 |
| 2019/0278891 | A1* | 9/2019 | Koren | G06F 21/126 |
| 2020/0004974 | A1* | 1/2020 | Ruiz | G06F 21/6236 |
| 2020/0193034 | A1* | 6/2020 | Rodriguez Bravo | ......... |
| | | | | G06F 21/6209 |
| 2020/0394110 | A1* | 12/2020 | Ramohalli Gopala Rao | ......... |
| | | | | G06F 16/285 |

OTHER PUBLICATIONS

Tang et al., "Prv2chain: Storage of Tree-structured Provenance Records in Blockchain with Linkage Privacy," 2021 IEEE International Conference on Blockchain and Cryptocurrency (ICBC) Year: 2021 | Conference Paper | Publisher: IEEE.*

Communication under Rule 71(3) EPC Received for European Application No. 21758261.8, mailed on Oct. 18, 2024, 6 pages.

Communication pursuant to Article 71(3) EPC, Received for European Application No. 21758261.8, mailed on May 23, 2024, 6 pages.

Decision to Grant pursuant to Article 97(1) received in European Application No. 21758261.8, mailed on Jan. 8, 2025, 02 pages.

* cited by examiner

DATA PROVENANCE TRACKING SERVICE

CROSS-REFERENCE TO RELATED APPLICATIONS

This application is a continuation of prior U.S. application Ser. No. 17/077,935, filed on Mar. 22, 2020, which is incorporated by reference herein in its entirety.

TECHNICAL FIELD

Embodiments pertain to tracking shared data as it moves between applications and/or computing devices. Some embodiments relate to tracking tags added to data to facilitate tracking data as it moves between applications and/or computing devices.

BACKGROUND

Computer applications and network-based services may create, use, and store data owned by or about the user to provide customized services to users. During the lifetime of the data, it may be transferred between, and stored on, many different computing devices. For example, network-based services may have a plurality of sites that provide computing resources to provide the service and this data may originate in, or be transferred to, one or more of these resources. Additionally, data may be shared between different applications and/or services to enable a seamless integration between those applications and/or services for the customer. Finally, modern system design stresses distributed systems that utilize many different computing devices at multiple sites to allow for scalability and reliability. User data may be consequentially stored on multiple computing devices across a network-based service in order to continue to provide the service if one or more computing devices are inoperable.

Due to a number of high-profile data breaches, both consumers and corporate customers are increasingly concerned about access to their data and the potential for misuse. Historically, organizations have focused on quickly detecting and preventing access to customer data from unauthorized applications or individuals. However, there is currently no technical solution to allow an application or service to conclusively prove that it is being a good steward with its use of customer data. Organizations may document their procedures to safeguard customer data in general, however, there is no way to document what happens with each piece of customer data through these increasingly complex systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
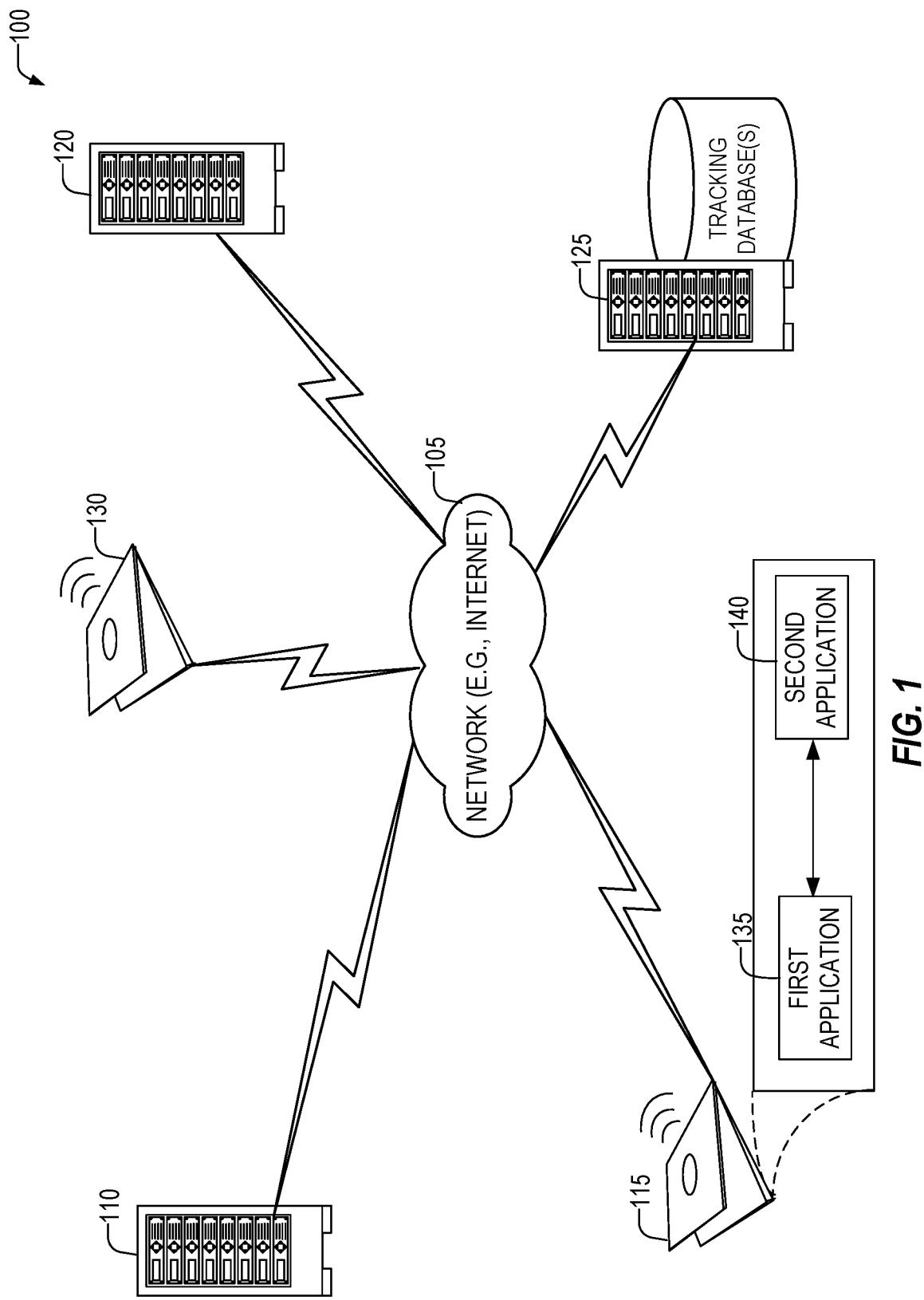
FIG. 1 illustrates a schematic of a data provenance tracking service according to some examples of the present disclosure.

A first potential solution to the problem of data proliferation is to limit where the data resides. This makes providing scalable and high-availability services and more transparent integrations with other services and applications more difficult, if not impossible. A second potential solution would be to set policies on how data is to be handled and then attempt to enforce them. While this is good in theory, there is no way to conclusively prove that specific items of data are handled according to the policy. Moreover, data that is shared with a third-party service or application is now beyond the control of these policies. A third potential solution to the above problem is to have a search infrastructure that searches for particular items of data on one or more computing devices when requested. This solution may require the provisioning of specialty hardware that may increase costs and complexity. Moreover, while this finds specific instances of the data, it does not provide an indication of where the data has been in the past.

Disclosed in some examples are methods, systems, devices, and machine-readable mediums which utilize digital tracking tags attached to data to monitor and/or control the data as it moves between applications and/or computing devices. The digital tracking tag may be embedded in the data (e.g., as a digital watermark) or associated with the data e.g., as metadata. In some examples, the digital tracking tag may include information about the data such as one or more of: an identifier of the data, information about a source and destination of the data, or a unique identifier of the customer whose data is being accessed or whom the data describes. In some examples, the digital tracking tag may include an address of a tracking database with which to record one or more events related to the data. For example, recipients, senders, or other participants in a data transfer event may register the data transfer event with the tracking database. In some examples, the tracking tag may have a link to a network location where information about the data is located (e.g., identifier of the data, the mapping, and the like).

The digital tracking tag may include rules about actions that are taken in response to events corresponding to that data. In other examples, the digital tracking tag may point to or indicate these rules. For example, the system may specify, through information in the tracking tag, actions that occur when the data moves from one application or service to another; when the data is deleted; when the data is copied; when the data is modified; or the like. Actions may include one or more of registering the action in a specified tracking database, actions applied to the data itself (deleting the data, modifying the data, encrypting the data, or the like), notification actions such as notifying a subject or owner of the data such as a user, or other actions. In some examples, the actions may be performed by executable code modules included in the tracking tag. Executable code modules may include object code, machine code, interpreted code (e.g., JAVA® code), or the like. In some examples, the executable code modules may be a container with OS-level virtualization with the code inside (e.g., a DOCKER® container).

A tracking database may record events that happen to the item of data. In some examples, the tracking database may be a network-based centralized service. That is, each service and each application may report events to a same tracking database (or group of databases). In other examples, the tracking database may be specific to particular services or applications. That is, the tracking database handles records for data moving within or between a group of one or more services or applications that subscribe to the particular tracking database. Other services or applications may use different tracking database services.

In some examples, when data is moved from a first application or service reporting to a first tracking database to an application or service reporting to a second tracking database, an entry may be made in a record of the first tracking database that notes the move and gives an address or identifier of the second tracking database. In some examples, an application or service may refuse to share data with another application or service unless they provide an address of a tracking database the application or service uses to record events. This allows an audit of the records of events associated with the data even when events are not recorded by the same tracking database. The audit starts with a first tracking database. Once the system reads a record indicating data was transferred to an application or service that utilizes a second tracking database, the system uses the address in the record of the first tracking database to contact the second tracking database and gets additional records from the second tracking database, and so on.

In other examples, each tracking database may register with a central authority. The central authority may keep a list of the tracking databases and which applications and services they store records for. During an audit a user may submit a request to the central authority for records matching submitted criteria. The central authority may have a directory indicating which of the individual tracking databases have records that match particular criteria. For example, the central authority may know that for individuals with last names that start with the letter a-m, that a first tracking database has those records, whereas for n-z, a second tracking database has those records. Thus, a query for specific records of specific identifiers may be targeted only to those tracking databases that are likely to have responsive records. In other examples, the central authority queries all databases that it has registered. In still yet other examples, the central authority provides addresses of the databases for the user's computing device to query rather than directly querying the databases itself.

By tracking data moving between applications, computing devices, and services, the system allows for the creation of an auditable record of data movement that can verify, for any particular item of data, that the application or service has handled data appropriately. By specifying a series of rules that data recipients must follow, the originating device may enforce rules on data usage. The tracking and rules may be customized for the data. In some examples, it may be customized based upon user preferences.

By providing this auditable record, good applications and services can prove that they are good stewards of user data, and user will have far greater visibility into which applications, computers, and services are accessing data about them and what that data is. Applications and services may then use the compliance with this system as a selling feature. In some examples, digital application stores may require compliance with these features for applications that access data of users in order to list the application in the store.

As noted, the tracking system would support reporting for stakeholders. Developers would be able to see reports showing what data was accessed by their applications and what customer data they had copies of. This effectively creates an inventory of customer data duplicated by each application and each service. Customers could see what applications and service had accessed their data, when, and for how long, and whether they had created any copies. Once this service was adopted by a critical mass of developers and customers, customers could demand compliance with usage of this service by refusing to use apps that don't use the service or give preference to the apps that do use the service. Applications may be encouraged to promote their usage and compliance with this concept within application store listings. While applications may evade these requirements and/or to lie about their compliance to these requirements, it is straightforward to detect this during an audit or forensic discovery process similar to how compliance with other standards is verified. Intentional or frequent lack of compliance may cause customers to question whether the app in question is indeed a "good app."

The present invention thus solves a technical problem of tracking distributed data storage and copying as well as sharing of data between services and applications using a technical solution of data-specific tracking tags and tracking databases. This improves the functioning of the computer system in a number of ways. For example, the described system distributes the work of tracking data and the events that happen to the data to the custodians of copies of that data. These custodians then record events in one or more (potentially distributed) tracking databases. This allows for sharing data between services and applications without restricting placement of the data to a small subset of available computing resources and at the same time removes the need for complex infrastructures and devices required for alternative solutions.

The digital tracking tag may be associated with an entire copy of a piece of data or may be attached to one or more portions or subsets of the piece of data. For example, when a piece of data is split into multiple portions and one portion may be stored in a first location and a second portion is stored in a second location, a same digital tracking tag may be applied to both portions, or different digital tracking tags may be applied to the different portions. Similarly, where two different pieces of data are combined into a single piece of data, the two pieces may have two different tracking tags. Each tracking tag may be maintained—such that a single piece of data may now have two different tracking tags.

Turning now to FIG. 1, a schematic of a data provenance tracking service 100 is shown according to some examples of the present disclosure. Computing device 115 may have one or more applications, such as applications 135 and 140 that may collect, receive, or generate items of data. An item of data may be a discrete piece of information stored in a digital form. For example, user data, customer data, or the like. Example items of data may include a file, an email, a text message, a video, audio, information collected about a user (e.g., location), and the like. A protected item of data is an item of data that is protected by the tracking and provenance system as described herein. Not all items of data may be treated as protected items of data. The data items that are to be protected may be chosen by an administrator (e.g., based upon a type of data) or by rules determining which data is protected.

In some examples, applications 135 and 140 may share one or more items of data between themselves. In addition, items of data may be sent to one or more computing devices 110, 120, 130. One or more computing devices 110, 120, and 130 may be associated with one or more distinct network-based services. One or more of computing devices 110, 120, and 130 may be part of a same network-based service or a different network-based service. In addition, one or more computing devices 110, 120, and 130 may be operated by a same or different entity.

As noted, first application 135 and second application 140 on computing device 115 may share data locally. In these examples, if the data item is a protected data item, the originating application (e.g., first application 135) may create a tracking tag and include the tracking tag with the item of data sent to the recipient application (e.g., second application 140). One or both of the originating application and recipient application may record the transfer and other events with one or more tracking database(s) 125. In some examples, the tracking database 125 may be one or more centralized or one or more distributed databases. For example, tracking database may be a node of a blockchain.

Data from computing device 115 may be sent by one or more of first application 135 or second application 140 to one or more of the computing devices 110, 120, 130 across network 105 (e.g., the Internet). For example, the data may be sent as part of providing one or more network-based services by computing devices 110, 120, or 130. If the item of data is protected, the data may be sent with a digital tracking tag. In some examples, the digital tracking tag may be created when a protected data item is created, received, or collected. In other examples, it is created upon receipt at a computing device or application that created or collected the protected data item of a request from a second application or service for a copy of that data.

In some examples, the digital tracking tag may be a data structure that may include one or more of a unique identifier of the item of data, a unique application identifier of the application making the request, a unique identifier of the customer whose data is being accessed, a timestamp, an address from which the request originated, a type of access, a purpose of the access, or other relevant information such as whether the data access was performed with application or delegated permissions, and if delegated, on behalf of which user/account. As noted, the tracking tag may include a mapping that specifies actions (such as registering the event in the tracking database) that the recipient is to take upon occurrence of specified events. As noted, one action may be registration of the event in a tracking database. The digital tracking structure may also have an address of the tracking database for recording events related to the data. For example, the computing device 115 may send protected data to computing device 110. Computing device 115 (e.g., one or more of the first application 135 or second application 140) may create one or more tracking tags and send the protected data with the one or more tracking tags to computing device 110.

One or both of computing devices 115 and 110 may utilize the tracking tag to report to the tracking database 125 that the protected data was transferred from computing device 115 to computing device 110. For example, by reporting the transfer in tracking database 125. Similarly, a transfer of protected data from computing device 110 to computing device 120 may be tracked and recorded. For this transfer, a same or different tracking tag may be used. In some examples, the tracking tag may be updated to reflect the new source and recipient. In some examples, the tracking tag may have a unique identifier of the item of protected data that is not changed. The unique identifier may be used to correlate records belonging to the same protected item of data across all computing devices and across tracking databases. The tracking tag may be stored with the data by a recipient of the protected data, or in a separate location.

As described, copying protected data from one computing device to another may be reported to tracking database 125. In other examples, in addition to, or instead of copying events, other data events are reported. Events may be any state change associated with the data. Example events may include loading the data into memory from a storage device, copying the data, aggregating the data with other data from a same or different user, moving the data, deleting the data, encrypting the data, decrypting the data, modifying the data, providing the data to still other applications, splitting the data into multiple portions, combining the data with other data, or the like. The tracking database may provide an auditable record that tracks and records events related to data. For example, the sending application, receiving application, or both may record the information (or a portion of the information) in the tracking structure. In some examples, each event may refer to a same tracking database, but in other examples different events may have different tracking databases (e.g., a delete event may be reported to a first tracking database and a copy event may be reported to a second tracking database).

By tracking events in addition to movement events (e.g., copying, deleting, etc.) more detailed audit records may be created that may provide additional information in the event of a data breach. For example, by reporting when data is encrypted and decrypted, in the event of a data breach, an audit may determine whether the data was breached in an encrypted or decrypted form. This may allow users that are the subject of said data to know the likelihood of whether someone unauthorized has access to the user data. In some examples, the events may include an encryption type and strength so that users may evaluate the likelihood of an attacker compromising the data.

Instead of, or in addition to reporting that a data event has occurred such as a transfer of a copy from one computing device or application to another, the system may proscribe (through instructions in the tracking tag) other actions, such as deleting, encrypting, decrypting, and the like.

Tracking database 125 may record reports from one or more computing devices. In some examples, the tracking database 125 may aggregate, and de-duplicate all the events associated with the received records so that there is a chronological record of events for each application, computing device, protected item of data, and/or the like that had accessed specific customer data. This establishes the provenance of discrete protected data access by each application and computing device. In some examples, in cases where multiple tracking databases are used, the databases may coordinate with each other to aggregate, correlate, and de-duplicate the tracking records. For example, a first tracking database may be chosen (e.g., based upon an assignment algorithm) to collect, correlate, and deduplicate records corresponding to a particular customer, or other criteria. This tracking database may then pull records corresponding to the criteria from all other tracking databases. The other tracking databases may then delete these records.

In some examples, in order for computing device 110 to receive an updated item of protected data from computing device 115, computing device 110 needs to provide a copy or portion of the tracking tag to computing device 115. Likewise, computing device 130 or 120 would provide a copy (or portion) of its tracking tag to computing device 110 for updated protected data. For examples where updated data is pushed from one computing device to another, the recipient computing device may have to periodically establish that it still has the most recent tracking tag by sending the tag to the sending computing device. For example, by sending the tracking tag to the sending computing device on a periodic basis. If the recipient fails to send the tracking tag, the next update of the user data may not be sent.

In some examples, one or more sending or recipient computing devices may instruct other computing devices with the protected item of data to delete the item of data. For example, the tracking tag may have one or more network addresses registered by the sender or recipient of the user data. The network addresses may be exchanged in the tracking tag. The network addresses may utilize webhooks or other APIs to instruct an application on a computing device to delete data belonging to one or more tracking tags. For example, based upon one or more criteria such as tracking identifier, subject identifiers (e.g., an identifier of the user to which the data relates), data type, size, date received, and the like.

In some examples, the tracking tag may include an expiry date which specifies an amount of time the application may store the data. Once the time expires, the application is to delete the data. In some examples, the tracking tag may have executable code which is run by the recipient which automatically sets a timer which, when it expires, causes the data to be deleted.

In some examples, the tracking tags are attached to the item of data. The tracking tags may be metadata with the item of data. In some examples, the tracking tags are embedded into the item of data, such as, for example, using watermarking or steganographic techniques. Example watermarking embedding techniques include spread-spectrum, quantization type, amplitude modulation type, and the like.

Figure 2:
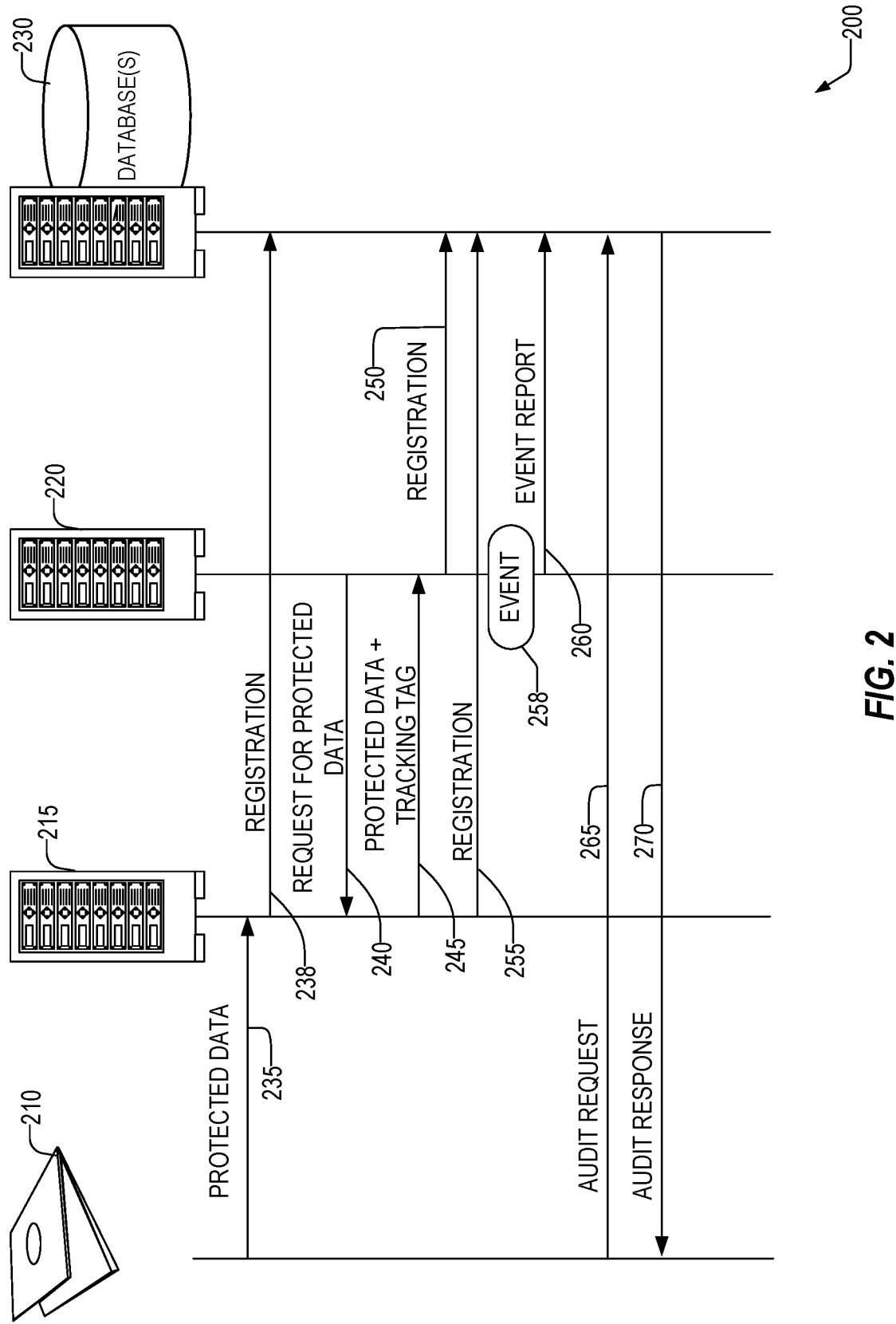
FIG. 2 illustrates a message sequence diagram of a data tracking system according to some examples of the present disclosure.

FIG. 2 illustrates a message sequence diagram 200 of a data tracking system according to some examples of the present disclosure. Protected data may be sent from a computing device 210 to a computing device 215 using message 235. Protected data may include user data or any other data that is to be tracked. Computing device 215 may store the protected data. In some examples, the computing device 210 may create a tracking tag and send the tracking tag along with the protected data. In other examples, the tracking tag may be created by the computing device 215. In some examples, the tracking tag may specify that when a copy is received by the computing device 215, the computing device 215 is to register the copy with the tracking database 230. In these examples, the computing device 215 may register the possession of the protected data using registration message 238 which is sent to the tracking database 230. Registration message may include one or more portions of the tracking tag. In some examples, the registration message may be sent as a webhook to a URL specified by the tracking tag or through other means.

Computing device 220, which may be part of a same or different service than that provided by computing device 215. Computing device 220 may request the protected data using message 240. The computing device 215 may verify that the computing device 220 is authorized to access the protected data. For example, if the protected data is user data, the computing device 215 may verify that the user has authorized the sharing of this data.

Computing device 215 may create a tracking tag or re-use a tracking tag created by computing device 210 (if computing device 210 initially created a tracking tag). The tracking tag may be updated if it is re-used. Computing device 215 may send the protected data with the tracking tag using message 245 or with a different message. As noted, the tracking tag may be sent along with or embedded in the protected data (such as using a digital watermark) or may be sent separately from the data in a separate message. In some examples, the tracking tag may have a list of events and corresponding actions that the computing device 220 is to take upon occurrence of the event. For example, one event may be receipt of the data and the action may be registration. Thus, the computing device 220 would recognize that by receiving the data, an event has occurred and triggered an action to register the data. Computing device 220 and/or computing device 215 may register the transfer of the protected data using message 250 and/or message 255 with tracking database 230. The message to register the transfer may include the tracking tag, or information from the tracking tag, such as a unique identifier of the data, a source computing device identifier, a destination computing device identifier, and the like. Computing device identifiers may include unique identifiers such as Internet Protocol (IP) Addresses, domain addresses, service identifiers, or the like.

In addition to providing the registration of the data, the tracking tag may be employed by one or more of the computing devices 210, 215, and 220 to search for data. For example, the signature of the tracking tag may be easily searched for to find matching data in a case in which the computing device needs to easily locate the data amongst millions of matching entries. In some examples in which the protected data is read and incorporated into a different digital file (e.g., a spreadsheet), the tracking tag may be separately stored and a link to the tracking tag may be created (e.g., in the different digital file) In other examples, a hash may be made of the protected data and the hash may be associated with the tracking tag (e.g., stored in the tracking tag). When matching the protected data with the tracking tag, a hash is made of the data and matched to the hash corresponding to the tracking tag. In some examples, a unique identifier of the data in the tracking tag may be, or include, a hash of the protected data.

Computing device 220 may detect an event 258 related to the protected data. The tracking tag may specify one or more actions for computing device 220 to take upon occurrence of one or more of the events. In some examples, an action may include registering the occurrence of the event with one or more tracking databases, such as tracking database 230. For example, the event in FIG. 2 may be one that is to be reported to the tracking database 230, which may be accomplished by sending a message 260 to the tracking database 230. The message to register the event may include the tracking tag, or information from the tracking tag, such as a unique identifier of the data, and the like.

Computing devices, such as an owner or subject of the protected data may ask for an audit for data matching supplied criteria. A subject of the protected data may be a user for whom the data (or a portion of the data) is about or describes. For example, if the protected data is location data of a device of the user, the user may not "own" the data, but the subject of the data is the user as it describes the user's location. The audit request message 265 may include one or more criteria. Criteria may include returning records of data owned by, or that is the subject of, one or more users, data type, date ranges, and the like.

The audit request message 265 may be received from tracking database 230. Tracking database 230 may search the database for any records matching the criteria provided. In some examples, the records may indicate that other tracking databases may have matching information. For example, if the data was shared with another computing device (not shown) that reported to a different tracking database. The computing device sharing the data with the computing device reporting to the different tracking database may obtain the address of the different tracking database and place a record of that tracking database in the tracking database 230. Tracking database 230 may pass this information back to the computing device 210 (which may then individually contact this other tracking database) or may contact the other tracking database on behalf of the computing device 210. In the latter case, the tracking database 230 may then aggregate all records from its own database as well as other tracking databases so identified and provide it with the audit response 270.

Figure 3:
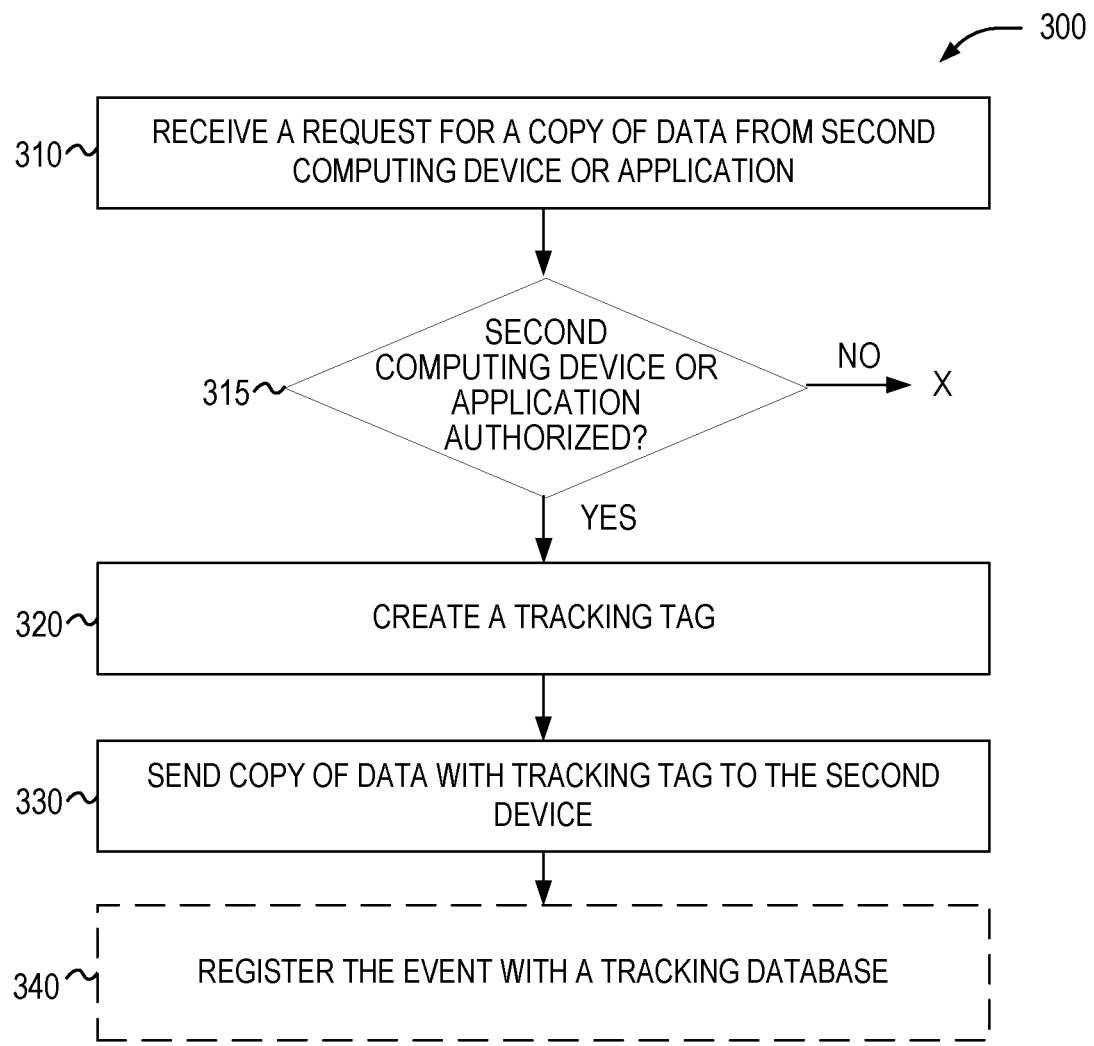
FIG. 3 illustrates a flowchart of a method of a first computing device or application sending protected data to a second computing device or second application according to some examples of the present disclosure.

FIG. 3 illustrates a flowchart of a method 300 of a first computing device or application sending protected data to a second computing device or second application according to some examples of the present disclosure. At operation 310, the first computing device or application receives a request for a copy of protected data from a second computing device or application. At operation 315 a determination is made as to whether the second computing device or application is authorized to have access to the protected data. For example, an owner or subject of the data may have privacy or other preferences that need to be consulted to make sure that the data is authorized to be shared with the second computing device or application. In other examples, the owner or subject may need to grant explicit permission to share this data. Other example authentication conditions may include the second computing device or application possessing a security token to prove that they have pre-registered with the first computing device or application.

If the second computing device or application is not authorized, the flow may end. The first computing device or application may provide a response or may not provide a response indicating the failure. If the second computing device or application is authorized, then at operation 320, a tracking tag is created or modified. As previously described the tracking tag may include various fields. In some examples in which the protected data was received from another computing device and the data already has a tracking tag, the tracking tag may be unmodifiable. In other examples, only certain fields of the tracking tag may be modified and some may not be modified. For example, the unique identifier of the data, the actions to take upon occurrence of events, and the like may be unmodifiable. In some examples, some fields may be modified to indicate that the protected data is being transferred from the first computing device or application to the second computing device or application. In still other examples, the provenance of the data may be tracked by added the recipient to a list of devices that have the data. For example, if the protected data originated in device 1, was sent to device 2, and finally device 3, a field in the tracking tag may list all three devices in order: device 1→device 2→device 3.

At operation 330, the first computing device may send a copy of the protected data with the tracking tag to the second device. At operation 340, in some examples, the first computing device may register the event with the tracking database. In some examples, to register the event, the first computing device may send the tracking tag or a portion of the tracking tag to the tracking database.

Figure 4:
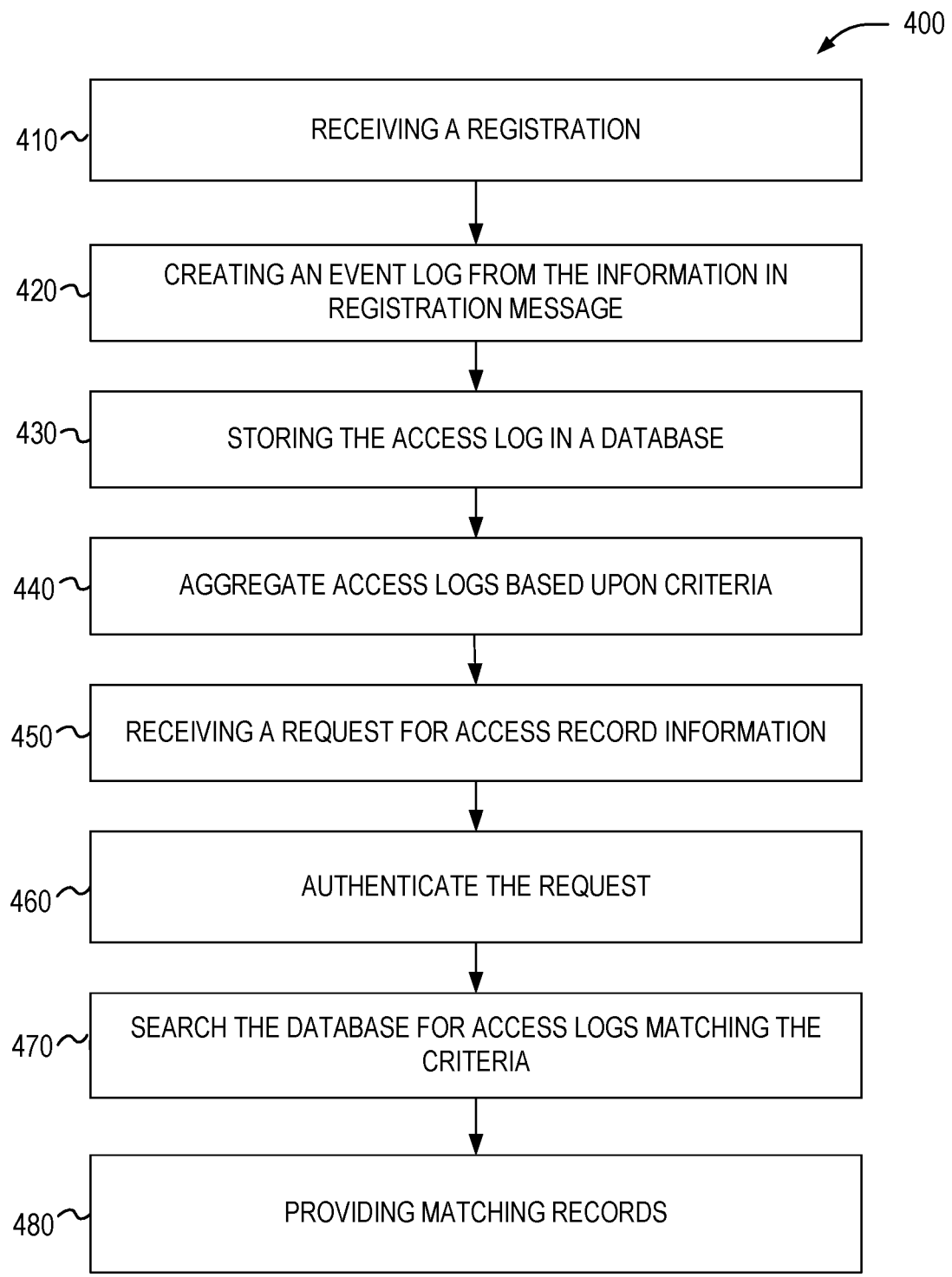
FIG. 4 illustrates a flowchart of a method of a tracking database registering an event associated with protected data according to some examples of the present disclosure.

FIG. 4 illustrates a flowchart of a method 400 of a tracking database registering an event associated with protected data according to some examples of the present disclosure. At operation 410 the tracking database may receive a registration message. The registration message may have information about the event, the information about the event may vary based upon the event. For example, an event indicating a transfer of a copy from one computing device to another may include a source and destination identifier of the computing devices involved. A copy of data made on a single computing device may indicate a location of the copy (e.g., a path name). Other information may be common across events, such as a unique identifier of the protected data. In some examples, the unique identifier may be assigned by a tracking database. In other examples, the unique identifier may be specific to a system that created the tracking tag. In some examples, the information may include an identifier of the owner or subject of the protected data. For example, the identifier of the owner or subject of the protected data may include a user identifier.

At operation 420, the tracking database may create an event log from the information in the registration message. For example, the tracking database may convert one or more formats of registration message into a standardized event log format for storage. At operation 430 the access log may be stored in a database. At operation 440, records matching one or more criteria may be aggregated. The one or more criteria may be a particular application, a particular data owner or data subject, a particular time frame, a particular source application or computing device, a particular destination application or computing device, a particular event, or the like. Operation 440 may happen periodically and may not be necessarily responsive to receiving a registration (but in other examples, may be responsive to receiving the registration).

Operations 450-480 describe method steps for responding to an audit request, which may be received at any time by the tracking database. At operation 450 the tracking database may receive a request for access record information. For example, an audit request from an owner or subject of the data; an application developer; an auditor; or another user. The request may include one or more criteria, such as a user identifier of the owner or subject, an application identifier (either a source, destination, or both), or the like. At operation 460 the request may be authenticated. For example, a user may be authenticated to access the access logs of their own data or data for which they are a subject. In other examples, application developers may be authenticated to see access logs related to their applications and the like. The criteria submitted may be used to determine whether to authenticate the request. For example, a user may be authenticated to request access logs of some data but not other data. If the user is not authenticated, then a failure may be sent.

Once the request is authenticated, at operation 470, the tracking database may search the database for access logs matching the criteria. This may include retrieving access logs from other tracking databases. For example, if a copy of the protected data is sent to another application or service that uses a different tracking database, the source application or service may record the tracking database used by the destination application or service in the tracking database used by the source application or service. At operation 480, matching records are returned to the requesting user.

Figure 5:
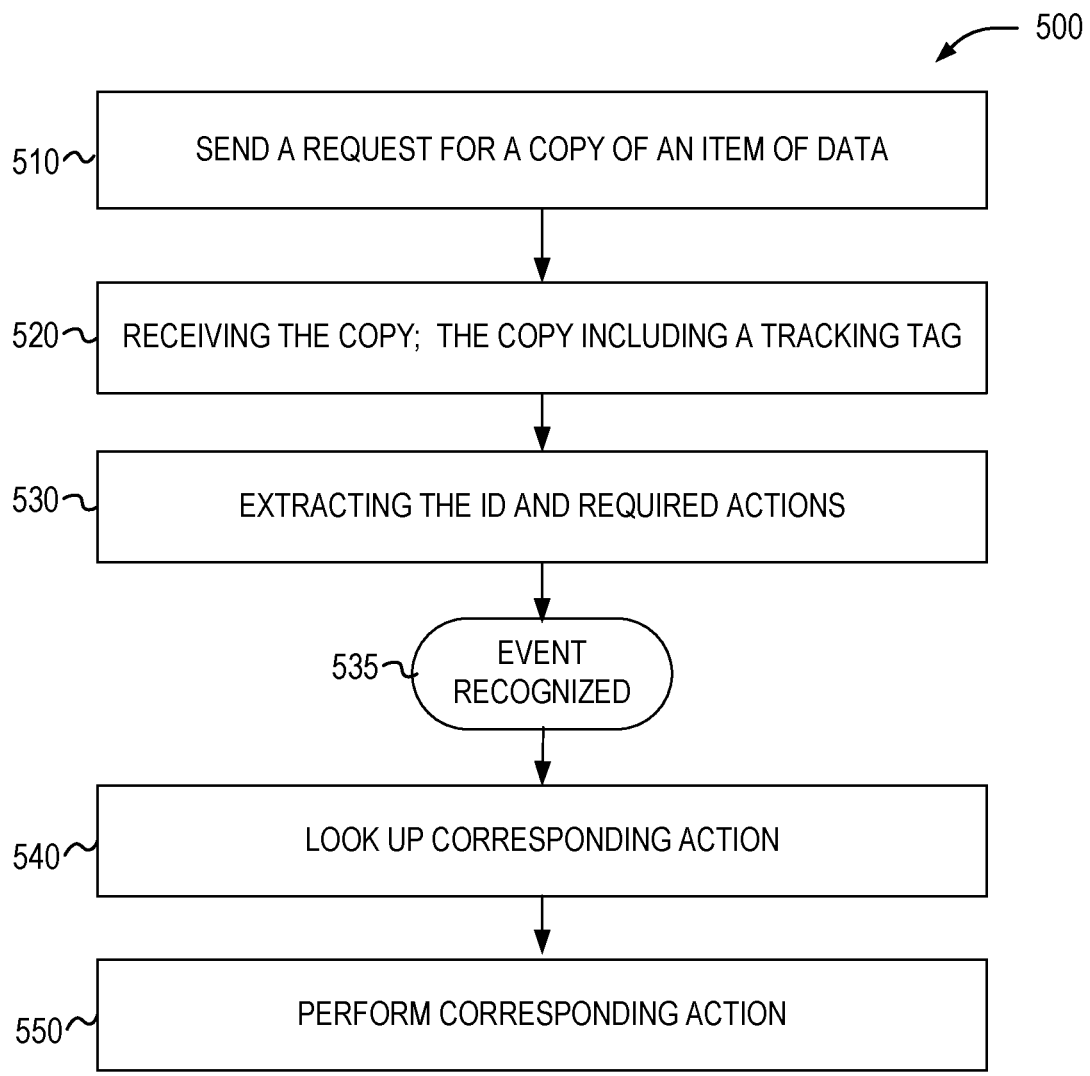
FIG. 5 illustrates a flowchart of a method of requesting an item of protected data from a second application or computing device according to some examples of the present disclosure.

FIG. 5 illustrates a flowchart of a method 500 of requesting an item of protected data from a second application or computing device according to some examples of the present disclosure. At operation 510, a request may be sent for a copy of a protected item of data. The request may include authentication credentials (e.g., an access token) and identifying information for the data. At operation 520, the computing device may receive a copy of the protected data, the copy including a tracking tag. At operation 530 information may be extracted from the tracking tag, for example, the identification and required actions in response to events. In some examples, an event is recognized at operation 535 which may include receiving the data at operation 520. Other events may include copying, accessing, encrypting, decrypting, deleting, or otherwise using the data. At operation 540 an action may be determined based upon the event. For example, the mapping between actions and events from the tracking tag may be consulted. At operation 550 the corresponding action that was determined at operation 540 may be performed. For example, registering the event with the tracking database. Other actions may include deleting the data, notifying a user or other application, or the like. Operations 535-550 may be performed in response to any recognized event, not just a receipt of a new data item based upon operations 510-530. Operations 535-550 thus represent operations that may be run independently of operations 510-530.

As noted, the tracking tag may include the unique application identifier of the application making the request, the unique identifier of the customer or subject of the data, the unique identifier of the protected data, unique identifiers of the source and/or destination application or service, and the like. These identifiers may be assigned by one or more network-based services, a tracking database, or the like.

As noted, the tracking tag may provide an action to take when an event is detected on the protected data. In other examples, the action may specify a link to a resource. For example, a resource located at the link may provide the action. This may allow for dynamically changeable actions for events that may be changed after the tracking tag is created. In some examples, certain events may have default actions associated with those events. For example, when a copy of data is received for the first time at a computing device, the default may be to register the copy of data. These default actions may not be specified in the tracking tag.

In some examples, instead of, or in addition to the tracking database, events may be registered in the tracking tag itself. The tracking tag may follow the data and list one or more of the events occurring to the data. This may have benefits in allowing events to be tracked even where the data passes through computing devices that do not have network access to the tracking database. Once the data moves to a computing device that does have network access, the events in the tracking tag may be reported to the tracking database.

In some examples, when a protected item of data is sent from a first computing device to a second computing device, the first computing device provides a URL of a control resource to the second computing device. The first computing device can then post instructions on actions to take (e.g., to delete, encrypt, and the like) to specific protected data items (as identified by a unique identifier) as the control resource. The second computing device may poll the control resource periodically. In other examples, the second computing device can provide a control URL to the first computing device. When the first computing device wants the second computing device to perform some action (e.g., delete, encrypt, or the like) on specific data items (as identified by a unique identifier), the first computing device may post a message (e.g., using a webhook) to the control resource URL. The second computing device may be notified and may take the requested action. In some examples, this technique may also be used to update the mapping table between actions and events so that the table may be dynamically modifiable after the tracking tag is updated. The second computing device may determine that an updated action is to be taken for an event for a specific protected item of data due to the posting of an update by the first computing device on a URL created for this purpose. The second computing device may update or replace the action for that event in the tracking tag.

Additionally, as previously noted, the registration messages may use webhooks such that an application may register a webhook with the source computing device for when copies or other data events occur. For example, if application A makes a copy of customer data using the tracing service described here and subsequently, application A allows application B to make a copy of that data; permission to do so may be made contingent on application B (and any subsequent copier) to post this fact to the webhook designed for this purpose. That would allow the system to track subsequent data copies and other events by third, fourth, fifth, etc. parties, which we would then record as a type of data access event.

As noted, events may be things that happen to the protected data. This may extend to events related to the passage of time since some other event occurred (such as making a copy or receiving the protected item of data). For example, after a threshold amount of time since the computing device obtained a copy of the protected data, the action may be to delete the protected data.

While the present disclosure defined tracking tags per-item of protected data, the tracking tags may also be more granular. That is, defining actions and events for accessing certain properties or portions of the item of protected data. For example, property A within a protected item of data vs. property A+B. In still other examples, tracking tags may instead of, or in addition have actions and events for particular users. This may also be expanded to particular users for particular properties and so on.

As also previously noted, in some examples, in order for a second computing device to receive an update to a protected item of data received from a first computing device, the second computing device may have to prove compliance with the system. For example, by sending all of or part of the tracking tag to the first computing device. In other examples, the second computing device may send a value calculated based upon the tracking tag to the first computing device (e.g., a hash calculated from the tracking tag). In still other examples, the first computing device may audit the compliance of the second computing device to ensure that it is complying with the system before sending the update.

In some examples, the tracking database may be a blockchain and each event log may be a record in the blockchain. The event logs may be unencrypted, or in some examples encrypted with a key that may be used to perform an audit. For example, event registration messages may be sent to one or more nodes on the blockchain and audit requests may be done by searching the blockchain for matching records.

As noted, the digital tracking tag may be associated with an entire copy of a piece of protected data or may be attached to one or more portions or subsets of the piece of protected data. In the latter examples, the certain portions of the protected data may be tracked and certain portions of the protected data may not. The protected portions may be identified by a pointer, hash, or other identifier in the tracking tag. When events occur that are associated with the data, in some examples, the action specified is taken regardless of which portion the event occurred to. In other examples, specified actions may only be executed for events that occurred on the portion of data identified by the pointer, hash, or other identifier. If the tracked portion of the protected data is split off from the non-tracked portion, the tracking tag may or may not continue to accompany the non-tracked portion (depending on the embodiment). The tracked portion may continue to have the tracking tag attached. The split may be reported, depending on the event rules in the tracking tag.

For cases where the entire item of data is protected and tracked by the tracking tag, when a protected piece of data is split into multiple portions and one portion may be stored in a first location and a second portion is stored in a second location. In some examples, a same digital tracking tag may be applied to both portions. In other examples, a different digital tracking tags may be applied to the different portions. In either example, the tags may be modified to reflect the storage at the new location and/or the split. Similarly, where two different pieces of data are combined into a single piece of data, the two pieces may have two different tracking tags. Each tracking tag may be maintained—such that a single piece of data may now have two different tracking tags.

Figure 6:
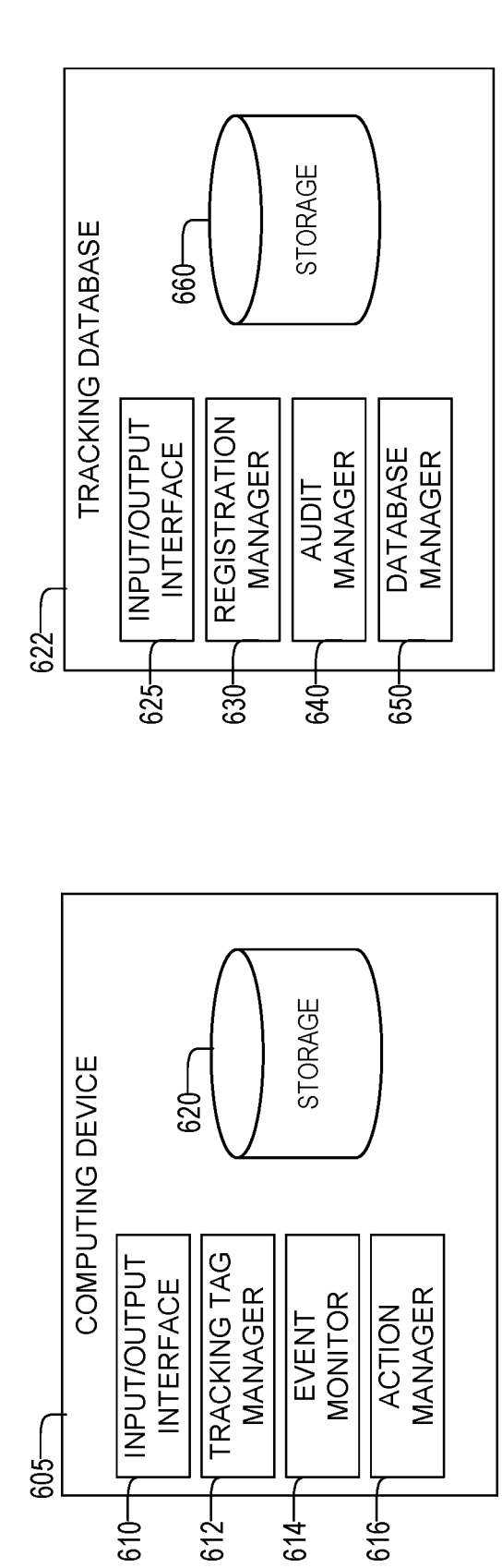
FIG. 6 illustrates a schematic of a computing device and a tracking database according to some examples of the present disclosure.

FIG. 6 illustrates a schematic of a computing device 605 and a tracking database 622 according to some examples of the present disclosure. The components of computing device 605 and tracking database 622 may be implemented by hardware, such as that shown in FIG. 7. Computing device 605 may be an example of computing device 115, 110, 130, 120, 210, 215, 220. It will be appreciated by one of ordinary skill in the art having the benefit of the present disclosure that there may be additional components on computing device 605 that are not shown. For example, an operating system, applications, and the like. Computing device 605 may perform one or more of the methods of FIGS. 3 and 5.

Computing device 605 may have an input/output interface 610. The input/output interface 610 may handle and manage both incoming and outgoing requests for protected data. The input/output interface 610 may implement one or more Application Programming Interfaces (APIs) that specify a protocol for requesting and receiving protected data. Input/output interface 610 may send and receive packets from one or more other computing devices over a network via a network device (e.g., an ethernet device or a wireless networking device) in one or more messages according to the protocol.

Tracking tag manager 612 may create and/or update tracking tags in responses to requests for protected data. Tracking tag manager 612 may determine which data is protected—for example, by identifying the presence of a tracking tag on the data; by identifying a tracking tag that is associated with the data; or by identifying that the data is of a class or type that is to be protected. The tracking tag manager 612 may, prior to sending protected data to another device or upon collecting or recognizing protected data, create or update the tracking tag. Tracking tag manager 612 may catalog the tracking tags of data stored in storage 620. For example, by storing tracking tags in storage 620 either with the data or separately. If the tracking tags are stored separately from the data, the tracking tag manager 612 may have a data structure that links the tracking tags with the locations where the protected data is stored. Tracking tag manager 612 may also update and manage an event and action table based upon the tracking tags. This table may specify actions taken for events for each item of protected data. In some examples, the tracking tag manager 612 may register events for which actions are indicated for the one or more tracking tags managed by the tracking tag manager 612 with the event monitor 614 for particular items of data.

Event monitor 614 may monitor for events corresponding to items of data that are registered by the tracking tag manager. When an event is detected, details of the event are sent to the action manager 616. For example, the event monitory 614 may monitor a file system of an operating system. Action manager 616 may consult the event and action table to determine an appropriate action. Action manager 616 may execute the appropriate action. An example action may include registration with the tracking database 622. Storage 620 may store protected data, tracking tags, an event and action table, and the like.

Tracking database 622 may be an example of tracking database 125, 230. It will be appreciated by one of ordinary skill in the art having the benefit of the present disclosure that there may be additional components on computing device 622 that are not shown. For example, an operating system, applications, and the like. Computing device 622 may perform the method of FIG. 4.

Tracking database 622 may have an input/output interface 625. The input/output interface 610 may handle requests to register events associated with protected data and audit requests. The input/output interface 625 may implement one or more Application Programming Interfaces (APIs) that specify a protocol for registering events. Input/output interface 610 may send and receive packets from one or more other computing devices over a network via a network device (e.g., an ethernet device or a wireless networking device) according to the protocol.

Registration manager 630 may receive registration messages and convert the registration message from a first format specified by an API to a second format for storage as a record in storage 660 according to a database schema. Audit manager 640 may handle requests for audits. The audit manager may receive audit requests from the input/output interface 625 and may authenticate such requests. Once a request is authenticated, the input/output interface 625 may search the storage 660 to find records matching the criteria submitted with the request. A response result is sent to the requestor via the input/output interface 625. Database manager 650 may aggregate and/or summarize records according to criteria such as the application sending it, the computing device sending it, the owner or subject of the protected data, the identification of the protected data, and the like. Database manager 650 may also manage and maintain the database stored in storage 660.

Figure 7:
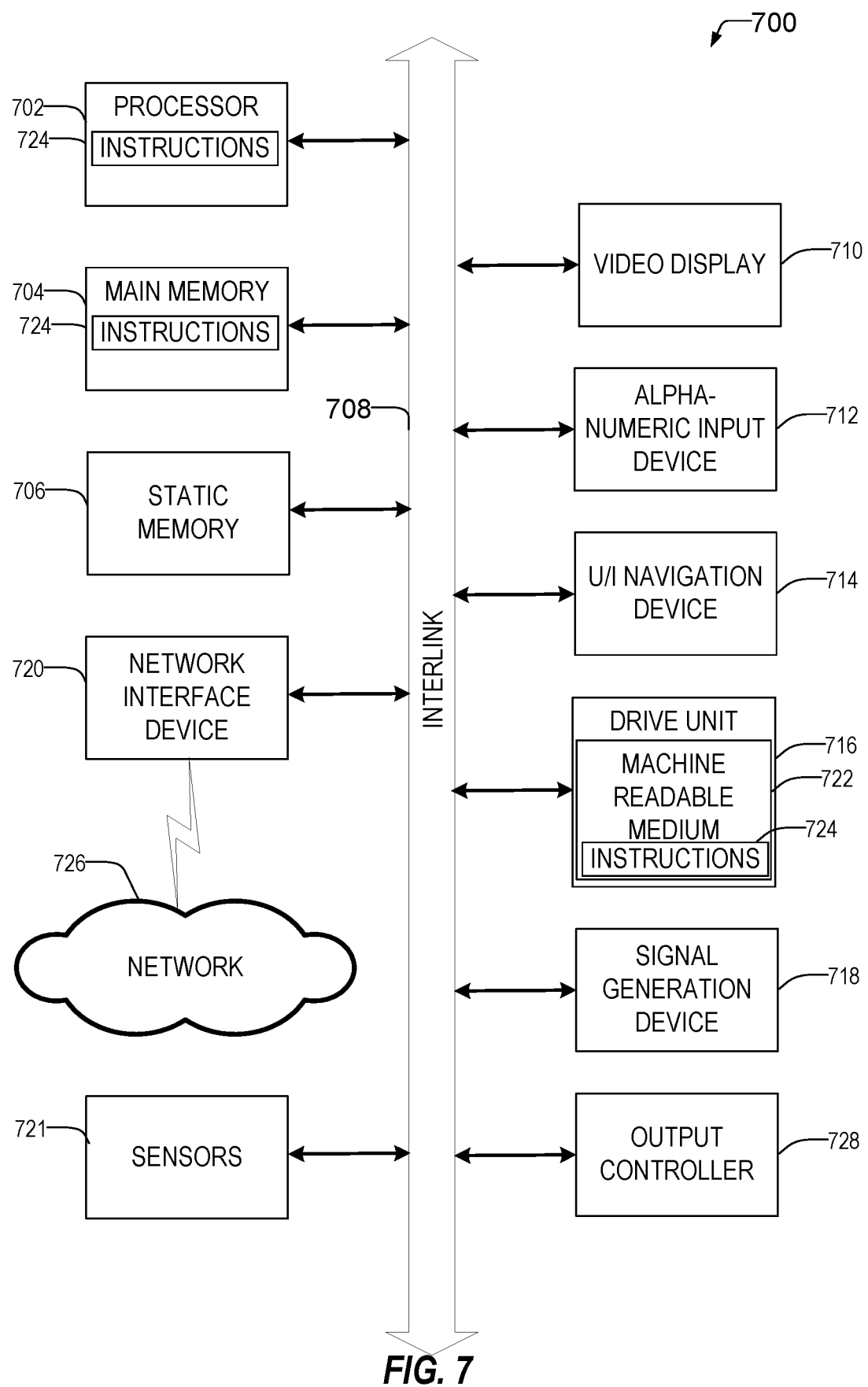
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a computing device (such as computing devices 110, 115, 120, 130), a tracking database 125, or the like. Machine 700 may perform one or more of the methods of FIGS. 3-5. Machine 700 may take the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

OTHER NOTES AND EXAMPLES

Example 1 is a method for tracking user data shared between a plurality of computing devices, the method comprising: at a first computing device: sending a request to a second computing device for a copy of an item of data stored by the second computing device; receiving from the second computing device the copy of the item of data, the copy including a tracking tag specific to the item of data, the tracking tag including data to determine an identifier of the item of data and a mapping between one or more actions to be performed and one or more events related to the copy of the item of data; extracting the identifier of the item of data and the mapping included in the tracking tag associated with the copy of the item of data; determining that a first event has occurred corresponding to the copy of the item of data; determining a first action corresponding to the first event based upon the tracking tag, the first action comprising a registration action to a tracking database identified in the mapping; responsive to determining that the first action comprises a registration action, registering the occurrence of the event in a first access record of the tracking database using the extracted identifier of the item of data and information about the tracking database identified in the mapping; at the tracking database: recording, in the first access record, the occurrence of the event; aggregating a first plurality of access records in the tracking database corresponding to the item of data, the first plurality of access records including the first access record and at least one other access record corresponding to a third computing device that has a second copy of the item of data; receiving, at the tracking database, a request for access record information, the request including one or more search criteria, the search criteria identifying the item of data, the request received from a fourth computing device; and providing, by the tracking database, a second plurality of records matching the search criteria, the second plurality of records selected from the first plurality of access records and including the first access record.

In Example 2, the subject matter of Example 1 includes, wherein the data to determine an identifier of the item of data and the mapping comprises a pointer to a network location where the identifier and the mapping are stored.

In Example 3, the subject matter of Examples 1-2 includes, wherein the data to determine an identifier of the item of data and the mapping comprises the identifier of the item of data and the mapping.

In Example 4, the subject matter of Examples 1-3 includes, wherein the tracking tag is a watermark, and wherein extracting the identifier of the item of data and the mapping included in the tracking tag associated with the copy of the item of data comprises reading the watermark.

In Example 5, the subject matter of Examples 1-4 includes, wherein the tracking tag includes a source and destination identifier of a computing device.

In Example 6, the subject matter of Examples 1-5 includes, wherein recording the occurrence of the event comprises recording the access record as a node in a blockchain.

In Example 7, the subject matter of Examples 1-6 includes, wherein the tracking tag includes executable code which, when executed, causes the first computing device to perform the registering.

Example 8 is a system for tracking user data shared between a plurality of computing devices, the system comprising: a first computing device comprising: a first processor; a first memory, the first memory storing instructions, which when executed by the first processor, cause the first computing device to perform operations comprising: sending a request to a second computing device for a copy of an item of data stored by the second computing device; receiving from the second computing device the copy of the item of data, the copy including a tracking tag specific to the item of data, the tracking tag including data to determine an identifier of the item of data and a mapping between one or more actions to be performed and one or more events related to the copy of the item of data; extracting the identifier of the item of data and the mapping included in the tracking tag associated with the copy of the item of data; determining that a first event has occurred corresponding to the copy of the item of data; determining a first action corresponding to the first event based upon the tracking tag, the first action comprising a registration action to a tracking database identified in the mapping; responsive to determining that the first action comprises a registration action, registering the occurrence of the event in a first access record of the tracking database using the extracted identifier of the item of data and information about the tracking database identified in the mapping; a tracking database, comprising: a second processor; a second memory, the second memory including instructions, which when executed by the second processor, cause the tracking database to perform operations comprising: recording, in the first access record, the occurrence of the event; aggregating a first plurality of access records in the tracking database corresponding to the item of data, the first plurality of access records including the first access record and at least one other access record corresponding to a third computing device that has a second copy of the item of data; receiving, at the tracking database, a request for access record information, the request including one or more search criteria, the search criteria identifying the item of data, the request received from a fourth computing device; and providing, by the tracking database, a second plurality of records matching the search criteria, the second plurality of records selected from the first plurality of access records and including the first access record.

In Example 9, the subject matter of Example 8 includes, wherein the data to determine an identifier of the item of data and the mapping comprises a pointer to a network location where the identifier and the mapping are stored.

In Example 10, the subject matter of Examples 8-9 includes, wherein the data to determine an identifier of the item of data and the mapping comprises the identifier of the item of data and the mapping.

In Example 11, the subject matter of Examples 8-10 includes, wherein the tracking tag is a watermark, and wherein the operations of extracting the identifier of the item of data and the mapping included in the tracking tag associated with the copy of the item of data comprises reading the watermark.

In Example 12, the subject matter of Examples 8-11 includes, wherein the tracking tag includes a source and destination identifier of a computing device.

In Example 13, the subject matter of Examples 8-12 includes, wherein the operations of recording the occurrence of the event comprises recording the access record as a node in a blockchain.

In Example 14, the subject matter of Examples 8-13 includes, wherein the tracking tag includes executable code which, when executed, causes the first computing device to perform the registering.

Example 15 is a system comprising: a first computing device comprising: means for sending a request to a second computing device for a copy of an item of data stored by the second computing device; means for receiving from the second computing device the copy of the item of data, the copy including a tracking tag specific to the item of data, the tracking tag including data to determine an identifier of the item of data and a mapping between one or more actions to be performed and one or more events related to the copy of the item of data; means for extracting the identifier of the item of data and the mapping included in the tracking tag associated with the copy of the item of data; means for determining that a first event has occurred corresponding to the copy of the item of data; means for determining a first action corresponding to the first event based upon the tracking tag, the first action comprising a registration action to a tracking database identified in the mapping; means for, responsive to determining that the first action comprises a registration action, registering the occurrence of the event in a first access record of the tracking database using the extracted identifier of the item of data and information about the tracking database identified in the mapping; a tracking database comprising: means for recording, in the first access record, the occurrence of the event; means for aggregating a first plurality of access records in the tracking database corresponding to the item of data, the first plurality of access records including the first access record and at least one other access record corresponding to a third computing device that has a second copy of the item of data; means for receiving, at the tracking database, a request for access record information, the request including one or more search criteria, the search criteria identifying the item of data, the request received from a fourth computing device; and means for providing, by the tracking database, a second plurality of records matching the search criteria, the second plurality of records selected from the first plurality of access records and including the first access record.

In Example 16, the subject matter of Example 15 includes, wherein the data to determine an identifier of the item of data and the mapping comprises a pointer to a network location where the identifier and the mapping are stored.

In Example 17, the subject matter of Examples 15-16 includes, wherein the data to determine an identifier of the item of data and the mapping comprises the identifier of the item of data and the mapping.

In Example 18, the subject matter of Examples 15-17 includes, wherein the tracking tag is a watermark, and wherein the means for extracting the identifier of the item of data and the mapping included in the tracking tag associated with the copy of the item of data comprises means for reading the watermark.

In Example 19, the subject matter of Examples 15-18 includes, wherein the tracking tag includes a source and destination identifier of a computing device.

In Example 20, the subject matter of Examples 15-19 includes, wherein the means for recording the occurrence of the event comprises means for recording the access record as a node in a blockchain.

In Example 21, the subject matter of Examples 15-20 includes, wherein the tracking tag includes executable code which, when executed, causes the first computing device to perform the registering.

Example 22 is a machine-readable medium, storing instructions, which when performed by a machine cause the machine to perform operations comprising: at a first computing device: sending a request to a second computing device for a copy of an item of data stored by the second computing device; receiving from the second computing device the copy of the item of data, the copy including a tracking tag specific to the item of data, the tracking tag including data to determine an identifier of the item of data and a mapping between one or more actions to be performed and one or more events related to the copy of the item of data; extracting the identifier of the item of data and the mapping included in the tracking tag associated with the copy of the item of data; determining that a first event has occurred corresponding to the copy of the item of data; determining a first action corresponding to the first event based upon the tracking tag, the first action comprising a registration action to a tracking database identified in the mapping; responsive to determining that the first action comprises a registration action, registering the occurrence of the event in a first access record of the tracking database using the extracted identifier of the item of data and information about the tracking database identified in the mapping; at the tracking database: recording, in the first access record, the occurrence of the event; aggregating a first plurality of access records in the tracking database corresponding to the item of data, the first plurality of access records including the first access record and at least one other access record corresponding to a third computing device that has a second copy of the item of data; receiving, at the tracking database, a request for access record information, the request including one or more search criteria, the search criteria identifying the item of data, the request received from a fourth computing device; and providing, by the tracking database, a second plurality of records matching the search criteria, the second plurality of records selected from the first plurality of access records and including the first access record.

In Example 23, the subject matter of Example 22 includes, wherein the data to determine an identifier of the item of data and the mapping comprises a pointer to a network location where the identifier and the mapping are stored.

In Example 24, the subject matter of Examples 22-23 includes, wherein the data to determine an identifier of the item of data and the mapping comprises the identifier of the item of data and the mapping.

In Example 25, the subject matter of Examples 22-24 includes, wherein the tracking tag is a watermark, and wherein the operations of extracting the identifier of the item of data and the mapping included in the tracking tag associated with the copy of the item of data comprises reading the watermark.

In Example 26, the subject matter of Examples 22-25 includes, wherein the tracking tag includes a source and destination identifier of a computing device.

In Example 27, the subject matter of Examples 22-26 includes, wherein recording the occurrence of the event comprises recording the access record as a node in a blockchain.

In Example 28, the subject matter of Examples 22-27 includes, wherein the tracking tag includes executable code which, when executed, causes the first computing device to perform the registering.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

What is claimed is:

1. A method for tracking user data shared between a plurality of computing devices, the method comprising:
    at a first computing device:

sending a request to a second computing device for a copy of an item of data stored by the second computing device;

receiving from the second computing device the copy of the item of data, the copy including a tracking tag specific to the item of data, the tracking tag including data to determine an identifier of the item of data and a mapping between one or more actions to be performed and one or more events related to the copy of the item of data;

extracting the identifier of the item of data and the mapping included in the tracking tag associated with the copy of the item of data;

determining that a first event has occurred corresponding to the copy of the item of data;

determining a first action corresponding to the first event based upon the tracking tag, the first action comprises communicating with a tracking database identified in the mapping; and responsive to determining that the first action comprises communication with the tracking database, sending a message to the tracking database corresponding to the event using the extracted identifier of the item of data and information about the tracking database identified in the mapping, the tracking database recording the occurrence of the event as well as an occurrence of a second event corresponding to a second copy of the item of data corresponding to the second computing device.

2. The method of claim 1, wherein sending a message to the tracking database comprises sending an event registration message to register the occurrence of the event.

3. The method of claim 1, wherein the mapping specifies different actions for different computing devices that receive copies of the item of data.

4. The method of claim 1, wherein the tracking tag includes a unique identifier of the item of data that remains static as the item of data is copied between computing devices.

5. The method of claim 1, wherein the tracking database is distributed across multiple computing devices.

6. The method of claim 5, wherein the tracking database utilizes blockchain technology.

7. The method of claim 1, wherein the tracking tag comprises executable code that causes specified actions to be performed upon occurrence of specified events.

8. A machine-readable storage device, storing instructions, which when executed by a machine, cause the machine to perform operations comprising:

sending a request to a computing device for a copy of an item of data stored by the computing device;

receiving from the computing device the copy of the item of data, the copy including a tracking tag specific to the item of data, the tracking tag including data to determine an identifier of the item of data and a mapping between one or more actions to be performed and one or more events related to the copy of the item of data;

extracting the identifier of the item of data and the mapping included in the tracking tag associated with the copy of the item of data;

determining that a first event has occurred corresponding to the copy of the item of data;

determining a first action corresponding to the first event based upon the tracking tag, the first action comprises communicating with a tracking database identified in the mapping; and responsive to determining that the first action comprises communication with the tracking database, sending a message to the tracking database corresponding to the event using the extracted identifier of the item of data and information about the tracking database identified in the mapping, the tracking database recording the occurrence of the event.

9. The machine-readable storage device of claim 8, wherein the operations of sending a message to the tracking database further comprise sending an event registration message to register the occurrence of the event.

10. The machine-readable storage device of claim 8, wherein the mapping specifies different actions for different computing devices that receive copies of the item of data.

11. The machine-readable storage device of claim 8, wherein the tracking tag includes a unique identifier of the item of data that remains static as the item of data is copied between computing devices.

12. The machine-readable storage device of claim 8, wherein the tracking database is distributed across multiple computing devices.

13. The machine-readable storage device of claim 12, wherein the tracking database utilizes blockchain technology.

14. The machine-readable storage device of claim 8, wherein the tracking tag comprises executable code that causes specified actions to be performed upon occurrence of specified events.

15. A computing device comprising:

a processor;

a memory, storing instructions which when performed by the processor, cause the processor to perform operations comprising:

sending a request to a computing device for a copy of an item of data stored by the computing device;

receiving from the computing device the copy of the item of data, the copy including a tracking tag specific to the item of data, the tracking tag including data to determine an identifier of the item of data and a mapping between one or more actions to be performed and one or more events related to the copy of the item of data;

extracting the identifier of the item of data and the mapping included in the tracking tag associated with the copy of the item of data;

determining that a first event has occurred corresponding to the copy of the item of data;

determining a first action corresponding to the first event based upon the tracking tag, the first action comprises communicating with a tracking database identified in the mapping; and responsive to determining that the first action comprises communication with the tracking database, sending a message to the tracking database corresponding to the event using the extracted identifier of the item of data and information about the tracking database identified in the mapping, the tracking database recording the occurrence of the event.

16. The computing device of claim 15, wherein the operations of sending a message to the tracking database further comprise sending an event registration message to register the occurrence of the event.

17. The computing device of claim 15, wherein the mapping specifies different actions for different computing devices that receive copies of the item of data.

18. The computing device of claim 15, wherein the tracking tag includes a unique identifier of the item of data that remains static as the item of data is copied between computing devices.

19. The computing device of claim 15, wherein the tracking database is distributed across multiple computing devices.

20. The computing device of claim 19, wherein the tracking database utilizes blockchain technology.

\* \* \* \* \*